G. TOLLEFSON.
CONVEYING, SORTING, AND SCREENING SYSTEM.
APPLICATION FILED JULY 10, 1914.

1,159,134.    Patented Nov. 2, 1915.

Witnesses
E. C. Skinkle
H. D. Kilgore

Inventor
Gilbert Tollefson
By his Attorneys
Williamson Merchant

UNITED STATES PATENT OFFICE.

GILBERT TOLLEFSON, OF BAGLEY, MINNESOTA.

CONVEYING, SORTING, AND SCREENING SYSTEM.

1,159,134.  Specification of Letters Patent.  Patented Nov. 2, 1915.

Original application filed June 26, 1913, Serial No. 775,866. Divided and this application filed July 10, 1914. Serial No. 850,204.

*To all whom it may concern:*

Be it known that I, GILBERT TOLLEFSON, citizen of the United States, residing at Bagley, in the county of Clearwater and State of Minnesota, have invented certain new and useful Improvements in Conveying, Sorting, and Screening Systems; and I do hereby declare the following to be a full, clear, and exact description of the invention, such as will enable others skilled in the art to which it appertains to make and use the same.

My invention has for its object to provide an improved conveying, sorting and screening system, especially adapted for use in handling potatoes in warehouses and is in the nature of a division of my U. S. Letters Patent, entitled "Conveying systems," issued July 14, 1914, under No. 1,103,709.

To the above end, the invention consists of the novel devices and combinations of devices hereinafter described and defined in the claims.

In the accompanying drawings, which illustrate the invention, like characters indicate like parts throughout the several views.

Figure 1:
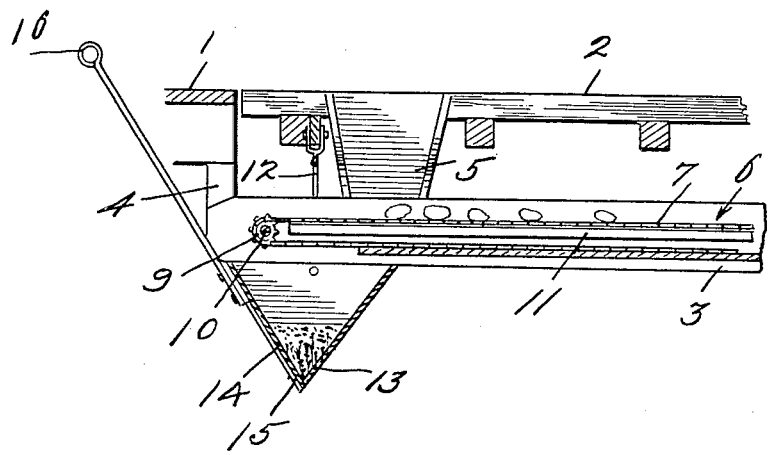
Figure 2:
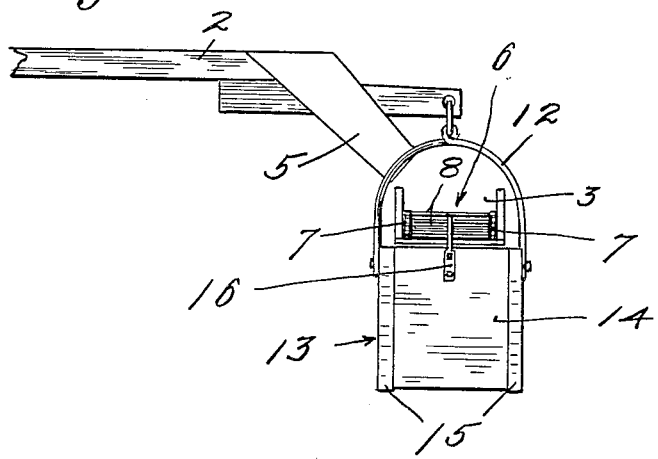

Referring to the drawings, Figure 1 is a view, partly in side elevation and partly in longitudinal vertical section, of the improved system; and Fig. 2 is an end elevation of the same.

The numeral 1 indicates the first floor of a warehouse, and the numeral 2 indicates a scale platform, located in substantially the same plane as said floor. A horizontally extended conveyer trough 3 is suspended within the basement, by timbers 4, from the floor 1, at an elevation below the scale platform 2. An inclined spout 5 is rigidly secured to the scale platform 2 and its delivery end is arranged to deliver into the conveyer trough 3.

A conveyer 6, comprising a pair of laterally spaced link belts 7, connected by a plurality of round iron slats 8, is mounted in the trough 3. The link belts 7 run over front and rear pairs of alined sprocket wheels 9, only the rear pair of which is illustrated. In actual practice, the front pair of sprocket wheels 9 will be secured to a power driven shaft and the rear pair of said wheels is secured to an idle shaft 10, journaled in the sides of the trough 3. The upper runs of the link belts 7 are guided by rails 11, secured to the sides of the conveyer trough 4 and the lower runs of said belts travel over and are supported by the deck or bottom of the trough 3.

Suspended by a bail 12 from the scale platform, is a hopper or bucket 13, arranged to receive the refuse as the same is scraped from the bottom of the trough 3 by the slats 8. In one side of the hopper 13 is mounted a gate 14 which slidably works between cleats 15, secured to said hopper. An operating rod 16 is secured to the gate 14, projects above the floor 1 and affords convenient means by which said gate may be lifted to dump the refuse from the hopper 13.

The potatoes hauled to the warehouse are first weighed on the scale platform 2, together with the vehicle, to secure the gross weight. The load of potatoes is then dumped onto the inclined spout 5 and delivered thereby onto the receiving end of the conveyer 6, which extends over the hopper 13. The upper run of the conveyer 6 travels in a direction to carry the potatoes away from the scale platform 2. All dirt, rubbish and small potatoes will be screened through the conveyer 6 and deposited on the deck of the conveyer trough 3, from which they are scraped by the lower run of the conveyer 6 into the hopper 13. As the potatoes roll down the spout 5, all rotten and defective ones may be thrown into the hopper 13. After the load of potatoes is removed by the conveyer 6, the vehicle, together with the waste deposited in the hopper 13 is again weighed to find the tare, which, subtracted from the gross weight, will give the net weight. At the delivery end of the conveyer 6 the potatoes may be directed to sacking spouts or sorting belts as described in my above identified invention. After each load of potatoes has been removed by the conveyer 6, the waste in the hopper may be dumped onto the floor of the basement or into a receptacle provided for receiving the same.

By the use of the improved system, the cost of handling potatoes is greatly reduced and it enables a buyer to thoroughly examine each load as the same rolls down the chute 5 from the scale platform to the conveyer.

What I claim is:—

1. In a device of the kind described, the combination with a scale platform and a weighing receptacle carried thereby, of a conveying and screening belt, arranged to receive commodities weighed on said scale platform and to deliver materials screened therethrough to said weighing receptacle, means for discharging the commodities from the scale platform onto the conveying and screening belt 2. In a device of the kind described, the combination with a scale platform and a weighing receptacle carried thereby, of a deck, and a slat and belt conveyer running over said deck and arranged to receive commodities weighed on said scale platform and to scrape materials screened through said conveyer onto said deck, into said weighing receptacle.

3. In a device of the kind described, the combination with a scale platform and a gate-equipped weighing receptacle carried thereby, of a conveyer trough, and a slat and belt conveyer, mounted in said trough and arranged to receive commodities weighed on said scale platform and to scrape materials screened through said conveyer into said weighing receptacle.

In testimony whereof I affix my signature in presence of two witnesses.

GILBERT TOLLEFSON.

Witnesses:
 HANS A. MELBY,
 ABE. L. JOHNSON.

Copies of this patent may be obtained for five cents each, by addressing the "Commissioner of Patents, Washington, D. C."